INVENTOR.
SVEN OLOF OLSSON
BY
Merchant & Gould
ATTORNEYS

Aug. 25, 1970 S. O. OLSSON 3,525,464

APPARATUS FOR AUTOMATICALLY AFFIXING VENT GROMMETS OR THE LIKE IN MATTRESS WALLS

Filed Dec. 11, 1968

12 Sheets-Sheet 2

INVENTOR.

SVEN OLOF OLSSON

BY

Merchant & Gould

ATTORNEYS

Aug. 25, 1970 S. O. OLSSON 3,525,464

APPARATUS FOR AUTOMATICALLY AFFIXING VENT GROMMETS OR THE LIKE IN MATTRESS WALLS

Filed Dec. 11, 1968 12 Sheets-Sheet 3

INVENTOR.

SVEN OLOF OLSSON

BY

Merchant & Gould

ATTORNEYS

INVENTOR.
SVEN OLOF OLSSON
BY
Merchant & Gould
ATTORNEYS

INVENTOR.
SVEN OLOF OLSSON
BY
Merchant & Gould
ATTORNEYS

INVENTOR.
SVEN OLOF OLSSON
BY
Merchant & Gould
ATTORNEYS

INVENTOR.
SVEN OLOF OLSSON
BY
Merchant & Gould
ATTORNEYS

INVENTOR.
SVEN OLOF OLSSON
BY
Merchant & Gould
ATTORNEYS

INVENTOR.
SVEN OLOF OLSSON
BY Merchant & Gould
ATTORNEYS

INVENTOR.
SVEN OLOF OLSSON
BY
Merchant & Gould
ATTORNEYS

INVENTOR
SVEN OLOF OLSSON
BY
Merchant & Gould
ATTORNEYS

INVENTOR.
SVEN OLOF OLSSON
BY
Merchant & Gould
ATTORNEYS

United States Patent Office 3,525,464 Patented Aug. 25, 1970

3,525,464

APPARATUS FOR AUTOMATICALLY AFFIXING VENT GROMMETS OR THE LIKE IN MATTRESS WALLS

Sven Olof Olsson, Minneapolis, Minn., assignor to Bechik Products, Inc., St. Paul, Minn., a corporation of Minnesota Filed Dec. 11, 1968, Ser. No. 782,866
Int. Cl. B27f 7/08
U.S. Cl. 227—18 10 Claims

ABSTRACT OF THE DISCLOSURE

Apparatus adapted to receive thereon a roll of preformed mattress wall material, a roll of mattress handles temporarily affixed together, a plurality of metal washers and a plurality of metal grommets formed of sufficiently rigid material so they can be forced through the mattress wall material, said apparatus including gear-like roller means for moving the mattress wall material through the apparatus with a minimum amount of lengthening of the material due to compression thereof, means for positioning handles on the outer surface of the material at desired intervals with washers correctly positioned on the opposite side of the material and means for forcing grommets down through the handles, the material and the washers and crimping the grommets to retain the assembly fixedly in position, and further including marking means for marking corners of the mattress wall so that the handles will be correctly positioned when the mattress wall is affixed to a mattress, and further including a knife for severing the mattress wall material at a desired length to enclose a mattress, all of said apparatus being sequentially and periodically operated by means of an endless belt having a plurality of switches associated therewith.

BACKGROUND OF THE INVENTION

Field of the invention

In general, mattresses have affixed to the walls thereof a plurality of handles utilized for moving the mattress and vent grommets or the like, which may be inserted through the walls of the mattress or may be utilized to secure the handles to the sides of the mattress. In general the grommets are formed in a variety of configurations and the mattress handles are generally elongated with a loop or opening at both ends thereof to receive a grommet or the like therethrough.

Description of the prior art

In the prior art holes are punched through the mattress wall at desired locations, washers are positioned coaxially therewith on the inner surface of the mattress wall and a grommet is forced therethrough after which the grommet is crimped by means of a hand-operated press. Each of the preceding steps is performed by hand and each requires a separate machine for the performance thereof. Because the steps are performed by hand the grommets are crimped different amounts which leaves the vent grommet or handle, generally, either too loose or too tight, either case causing the assembly to pull out easily. Also, the operation of each of the steps and the assembly of all the various parts prior to crimping in the hand press is extremely time consuming and unreliable.

SUMMARY OF THE INVENTION

The present invention pertains to apparatus for automatically affixing vent grommets in mattress walls including a base having mounted thereon advance means for moving preformed mattress wall material through the apparatus, washer positioning means having a supply of washers associated therewith for positioning the washers adjacent the inner surface of the wall material, grommet positioning means having a supply of grommets associated therewith for positioning a grommet in approximate coaxial alignment with the washer, crimping means for engaging the grommet and forcing it through the mattress wall and the washer and crimping the end thereof to hold the assembly fixedly in place, cutting means for severing desired lengths of said mattress wall and means for sequentially and periodically energizing all of the above means.

It is an object of the present invention to provide an automatic apparatus for affixing vent grommets in mattress walls.

It is a further object of the present invention to provide automatic apparatus for affixing elongated handles to mattress walls.

It is a further object of the present invention to provide automatic apparatus for completely assembling mattress walls, with mattress handles and vent grommets therein in the desired location.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures.

DESCRIPTION OF THE PREFERRED EMBODIMENTS

Figures 1, 13, 14:
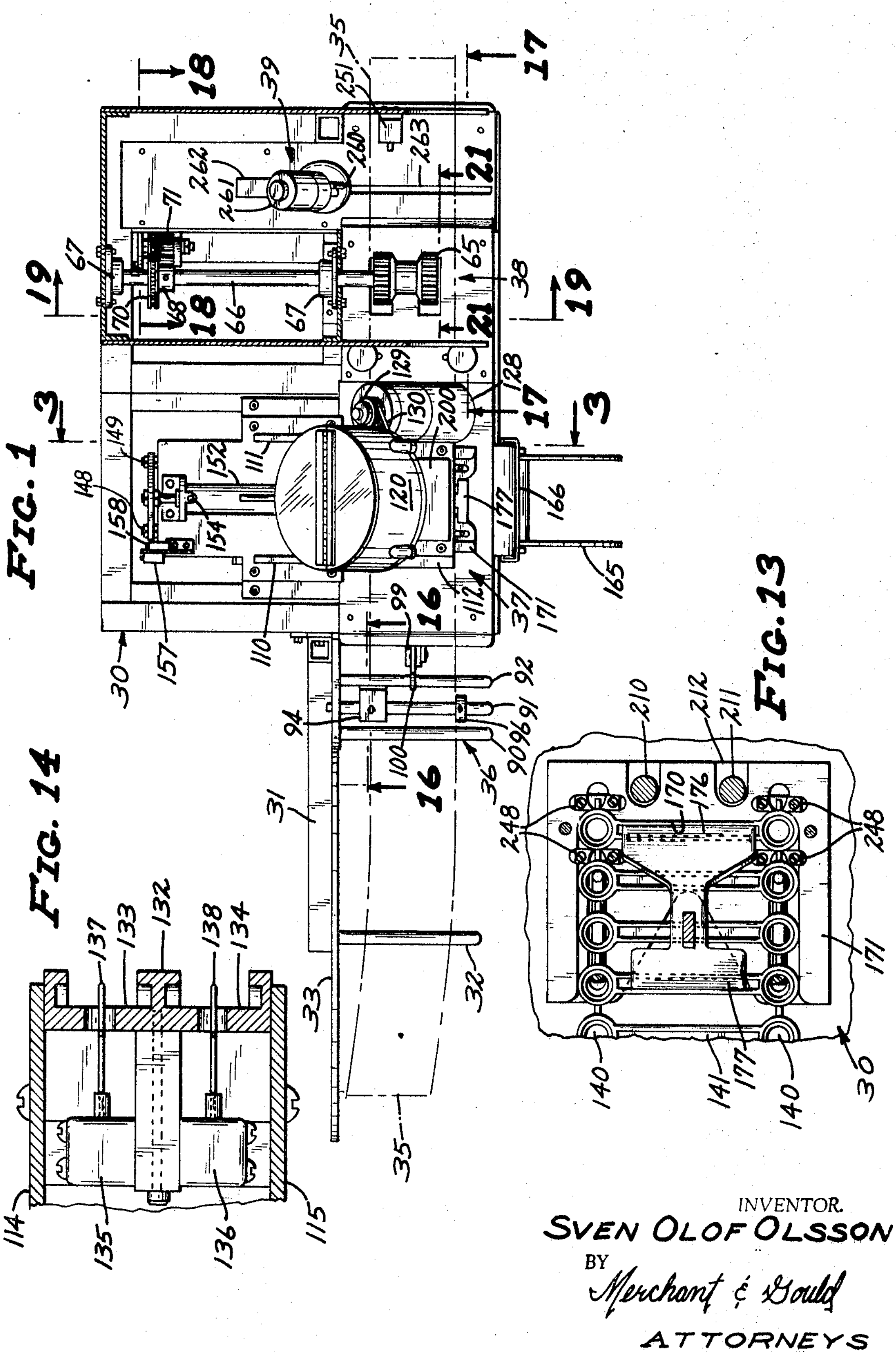
FIG. 1 is a view in top plan of the apparatus for installing vent grommets or the like in mattress walls, portions thereof broken away and shown in section.
FIG. 13 is an enlarged sectional view as seen from the line 13—13 in FIG. 3.
FIG. 14 is an enlarged sectional view as seen from the line 14—14 in FIG. 3.
Figures 2, 15:
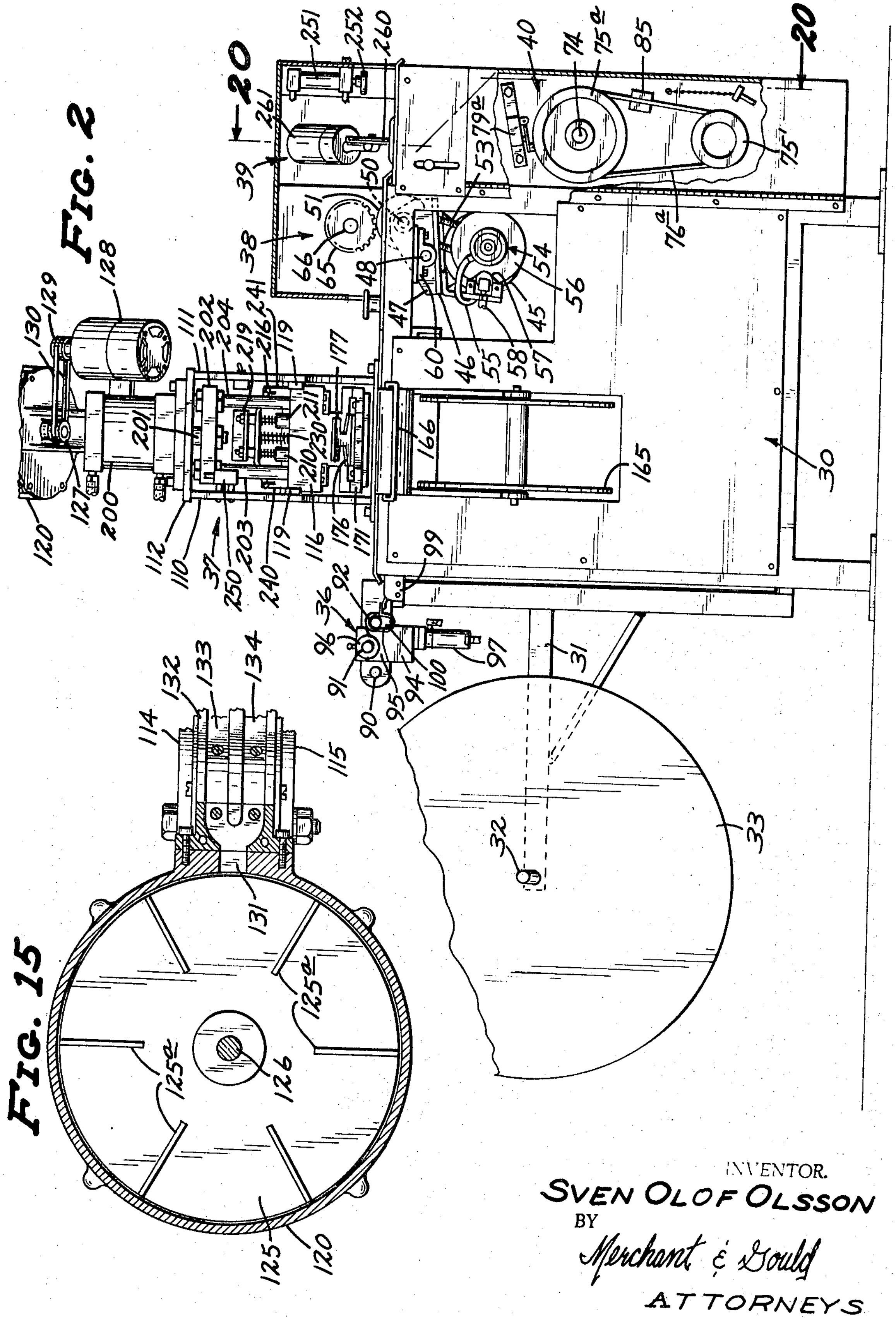
FIG. 2 is a view in front elevation of the apparatus illustrated in FIG. 1, portions thereof broken away and shown in section.
FIG. 15 is an enlarged sectional view as seen from the line 15—15 in FIG. 3.
Figure 28:
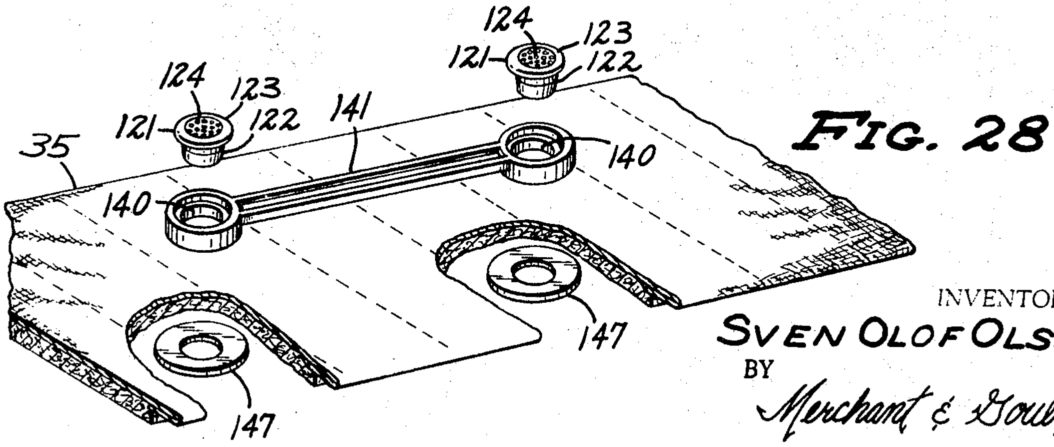
FIG. 28 is an exploded view in perspective illustrating the various components of a handle-vent grommet assembly, portions thereof broken away and shown in section.

Referring to FIGS. 1 and 2 a generally table-like base 30 can be seen having mounted thereon the various components of the apparatus for automatically affixing vent grommets and/or mattress handles to mattress wall material. At the left side of base 30 an arm 31 extends generally horizontally outwardly with a spindle 32 affixed thereto in a horizontal position and a guide disc 33 positioned adjacent the spindle 32. The spindle 32 is adapted to receive a large roll or source of preformed mattress wall material 35 (illustrated in broken lines in FIG. 1 and in full lines in FIGS. 16, 21 and 28). The mattress wall material 35 may be formed from any desired material and with any desired material and with any desired thickness and width. The mattress wall material 35 is threaded through corner marking means generally designated 36, handle and/or vent grommet installing means generally designated 37, material drive or advance means generally designated 38, and material cutting means generally designated 39. The mattress wall material 35 advances from the spindle 32 at the left of the base 30 across the top of the base 30 and toward the right thereof. In addition to the above a compartment at the right of the base 30 contains adjustable timing or energizing means generally designated 40 which actuates or energizes the various above-described means periodically and in the correct sequence. It should be understood that the following descriptions of the above-described means are preferred but many innovations and modifications may be provided by those skilled in the art.

Figure 18:
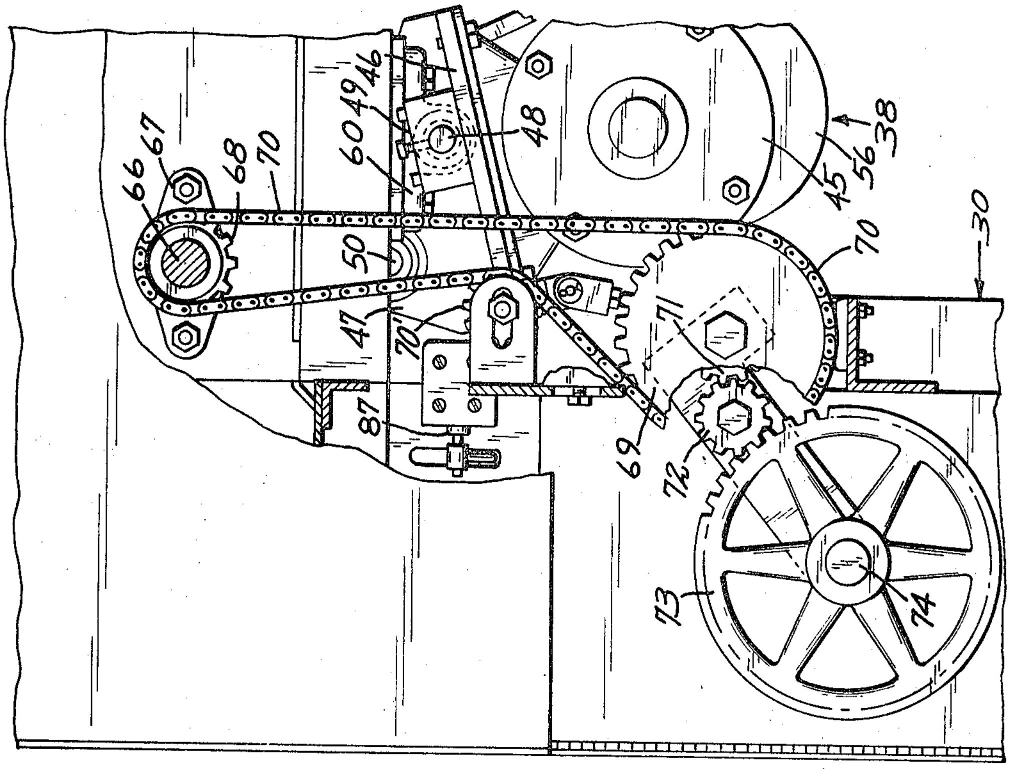
FIG. 18 is an enlarged sectional view as seen from the line 18—18 in FIG. 1, portions thereof broken away.
Figure 17:
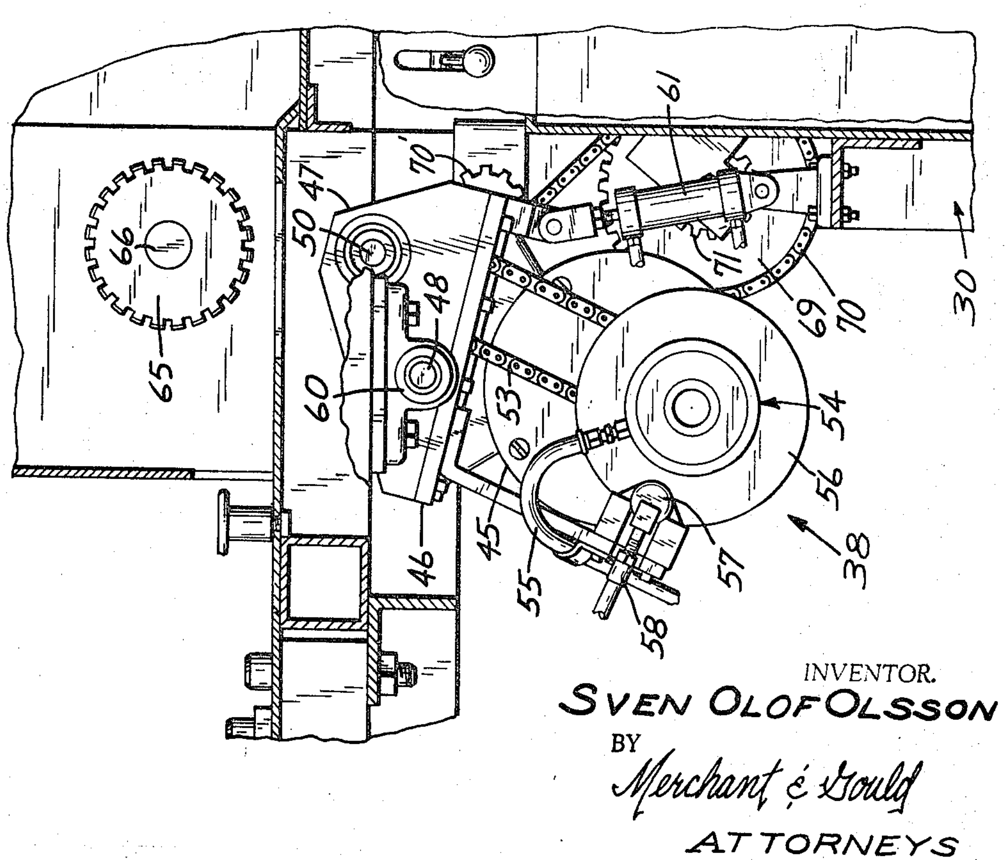
FIG. 17 is an enlarged sectional view as seen from the line 17—17 in FIG. 1, portions thereof broken away.
Figure 19:
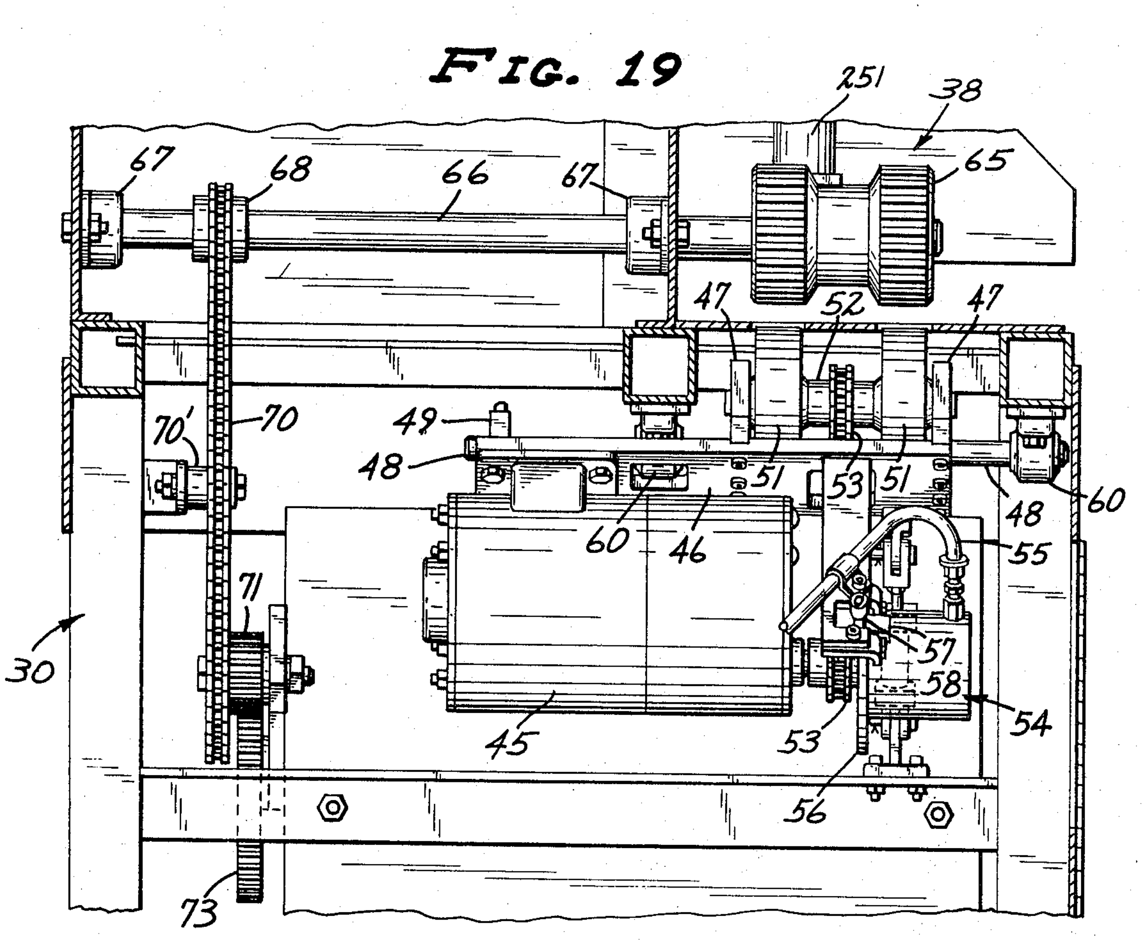
FIG. 19 is an enlarged sectional view as seen from the line 19—19 in FIG. 1, portions thereof broken away.

The material drive or advance means 38 is illustrated in detail in FIGS. 17, 18 and 19. A motor 45 is mounted on the underside of a plate 46 with the shaft thereof extending generally parallel with the plate 46. A pair of mounting plates 47 are affixed to the other side of the plate 46 generally perpendicular thereto and in a parallel spaced apart relationship. A mounting shaft 48 extends from a fixedly attached bracket 49 at one end of the plate 46, through bearings in the mounting plates 47 and somewhat past the opposite end of the plate 46, generally parallel with the shaft of the motor 45. A second shaft 50 is journalled in bearings in the plates 47 and has a pair of flexible drive wheels 51 mounted thereon in spaced apart relation with a drive sprocket 52 mounted therebetween. The drive sprocket 52 is driven by means of a chain 53 engaged over a sprocket attached to the shaft of an air operated clutch assembly 54.

The particular clutch assembly 54 utilized in this embodiment is not illustrated in detail since it does not form a portion of this invention and any of a great variety of electrical, magnetic and air-operated clutches could be utilized. The chain and sprocket 53 and the shaft of the clutch 54 are associated with the shaft of the motor 45 so that application of air pressure to the inlet conduit 55 energizes the clutch and connects the shaft of the motor 45 to the sprocket and chain 53 whereby when the motor 45 is running, the drive wheels 51 will operate. An enlarged disc 56 is also attached to the shaft of the clutch 54 and caliper type brakes 57 are mounted on the underside of the plate 46 so as to engage the disc 56 therebetween in a pinching type movement upon the application of air to a conduit 58. The conduits 55 and 58 receive air through a valve system (not shown) whereby the caliper type brakes 57 are energized to engage the disc 56 when the clutch 54 is deenergized and vice versa.

The mounting shaft 48 is journalled in a pair of pedestal type bearings 60 which are affixed to the base 30 so that the drive wheels 51 are aligned with openings in the upper horizontal surface thereof. The motor assembly 45 is mounted on the plate 46 so that it normally hangs from the mounting shaft 48 with the drive wheels 51 positioned just below the horizontal surface of the base 30. An air cylinder 61 is pivotally attached at one end to a brace of the base 30 while the piston thereof is pivotally attached to the underside of the plate 46 (see especially FIG. 17). The air cylinder 61 is mounted so that applying air pressure thereto causes rotation of the plate 46 in a counterclockwise direction, in FIG. 17, and protrusion of the drive wheels 51 through the openings in the upper surface of the base 30.

Figure 21:
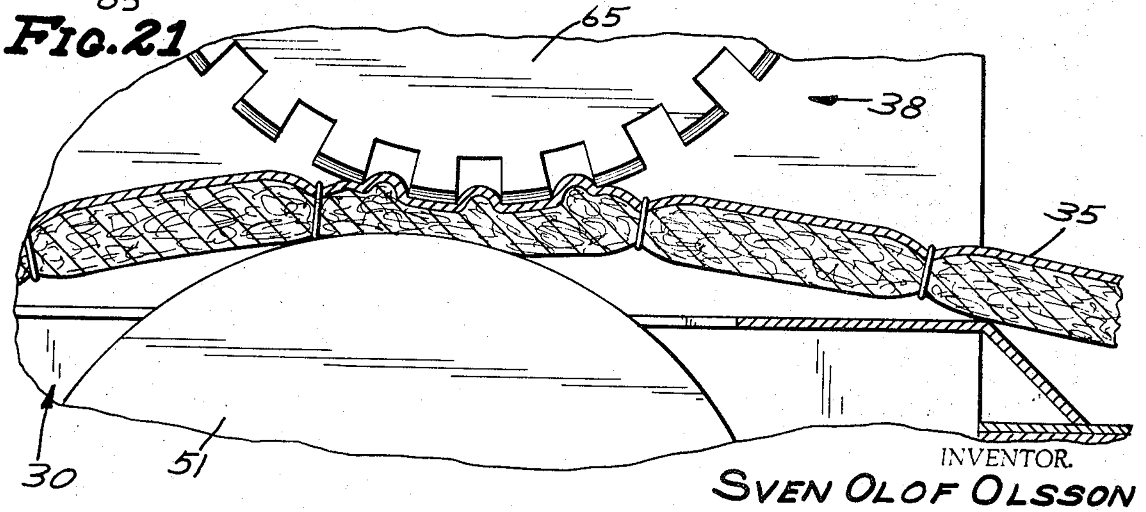
FIG. 21 is an enlarged sectional view as seen from the line 21—21 in FIG. 1 showing mattress wall material positioned to be advanced, portions thereof broken away.

A roller 65 having spaced apart portions, each with an enlarged diameter and radially outwardly extending teeth, or a gear-like periphery, is mounted at an end of a shaft 66. The shaft 66 is rotatably mounted in a generally horizontal direction by a pair of spaced apart bearings 67, so that the rollers 65 at the end thereof is positioned with the diametrically enlarged portions generally parallel with the drive wheels 51 and positioned thereabove in a spaced apart relationship when the air cylinder 61 is deenergized. When the air cylinder 61 is supplied with pressurized air the drive wheels 51 are moved upwardly to engage mattress wall material 35 tightly against the roller 65 (see FIG. 21). Because the roller 65 has a gear-like outer periphery the mattress wall material 35 bunches within the openings between the teeth (as shown in FIG. 21), rather than being compressed and unduly elongated. Further, it should be noted that different thicknesses of wall material 35 would be elongated different amounts by a solid roller 65, which elongation would greatly affect the ability of the present apparatus to measure mattress wall lengths. Since the wall material 35 is not unduly elongated by the advance means 38 but remains in a nearly natural state, the present apparatus is capable of measuring mattress walls relatively accurately regardless of the thickness of the mattress wall material 35.

Figure 20:
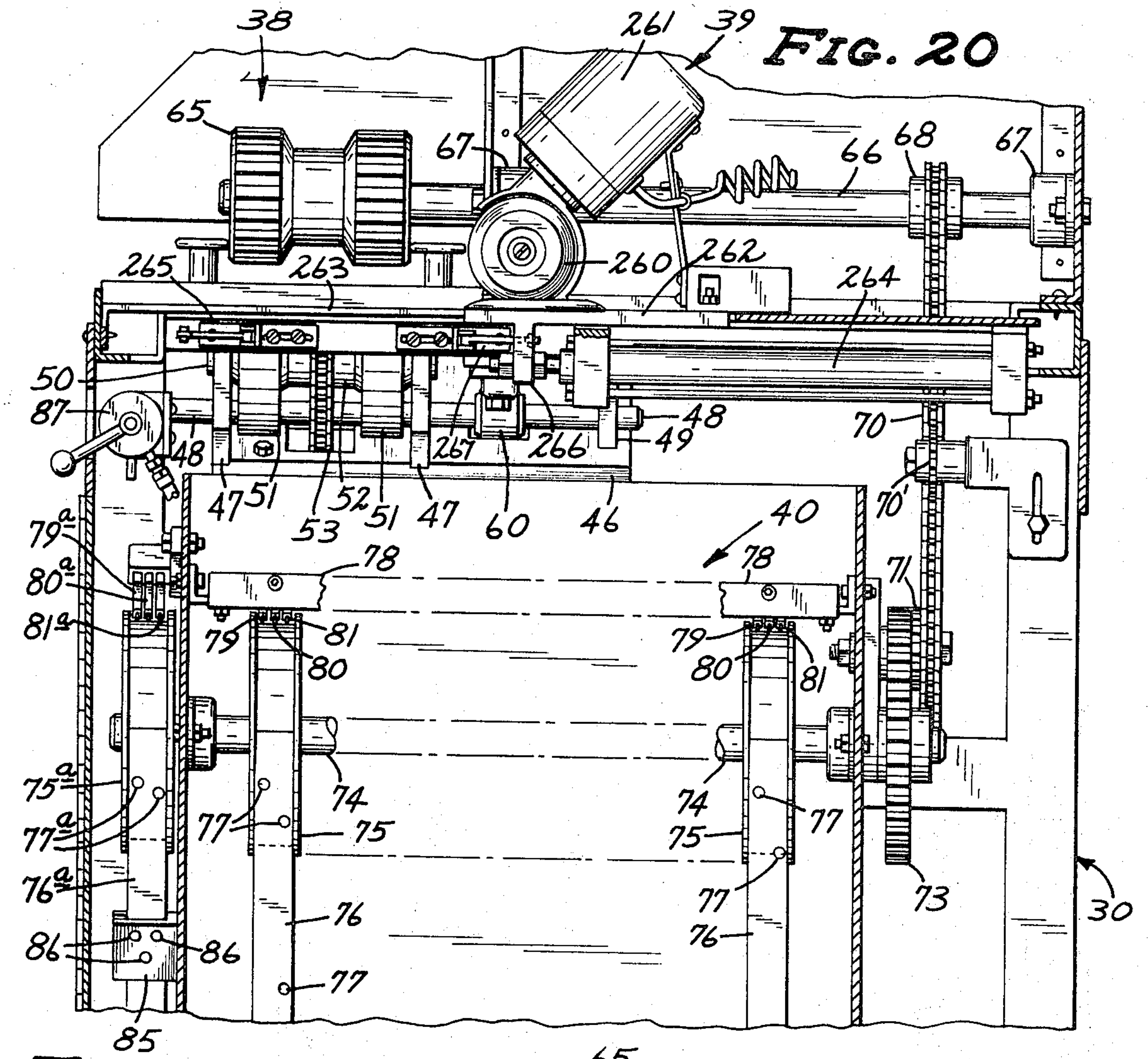
FIG. 20 is an enlarged sectional view as seen from the irregular line 20—20 of FIG. 2, portions thereof broken away.

When the air cylinder 61 is energized and the drive wheels 51 move upwardly to engage mattress wall material 35 against the roller 65, the roller 65 and the shaft 66 are rotated with the drive wheels 51. The shaft 66 has a sprocket 68 fixedly attached thereto for rotation therewith and a second sprocket 69 rotatably mounted therebelow (see FIGS. 18, 19 and 20) is rotated thereby through a chain 70. An idler sprocket 70′ is mounted for limited adjustment in engagement with the chain 70 approximately mid-way between the sprockets 68 and 69 and maintains the chain 70 sufficiently taut for the correct operation thereof. A gear 71 is mounted on the same shaft as the sprocket 69, for rotation therewith, which gear 71 meshes with an idler gear 72 which in turn meshes with a larger gear 73. The gear 73 is mounted on a shaft 74 for rotation therewith. The shaft 74 forms a portion of the adjustable timing or energizing means 40 which is mounted within a compartment at the right of the base 30, as seen in FIGS. 2 and 20.

Figure 26:
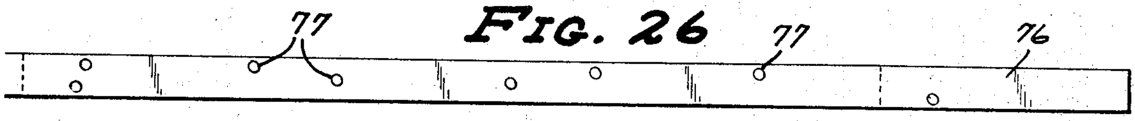
FIG. 26 is a plan view of a punched tape for controlling the sequential operation of the apparatus illustrated in FIG. 1.

A plurality of pulleys 75 are mounted on the shaft 74 for rotation therewith in a generally spaced apart relationship therealong. Each of the pulleys 75 represents a different channel or mode of operation for the apparatus and has engaged thereover an endless belt 76. In this embodiment each of the endless belts 76 are maintained in frictional engagement with the pulleys 75 by means of a free spool 75' (one of which is shown in FIG. 2) hanging in the lower loop thereof. The endless belt 76 has holes 77 punched therein at various positions coinciding with a particular position in the mattress wall material 35 extending over the top of the base 30 (see specifically FIGS. 26 and 27). A bar 78 extends above the pulleys 75 parallel with the shaft 74 and has three switches 79, 80 and 81 attached thereto for each of the pulleys 75. The three switches 79, 80 and 81 associated with each of the pulleys 75 is mounted directly thereabove so that movable arms thereon are engaged with the endless belt 76 and upon the occurrence of a hole 77 directly below either of the arms the switch 79, 80 or 81 closes momentarily. In the present embodiment the switch 79 associated with each of the pulleys 75 actuates the corner marking means 36, the switch 80 associated with each of the pulleys 75 actuates the handle and/or vent grommet installing means 37, and the switch 81 associated with each of the pulleys 75 actuates the material cutting means 39. The particular pulley 75, endless belt 76 and associated switches 79, 80 and 81 being utilized at any time is determined by a master switch (not shown) on a control panel at the front of the base 30. Thus, each of the endless belts 76 can be prepunched so that a particular length of mattress wall material 35 can be operated on by the apparatus and corners will be marked at the desired locations, handles and/or vent grommets will be installed at desired locations and the material 35 will be automatically severed at the desired lengths.

An additional pulley 75a is attached to the end of the shaft 74 extending outwardly through the front of the base 30 and three switches 79a, 80a, and 81a are associated therewith. A punch block 85 is attached to the base 30 below the pulley 75a and has a groove therein so that an endless belt 76a can be engaged about the pulley 75a and extend through the groove in the punch block 85. The punch block 85 has three holes 86 extending therethrough in horizontally spaced apart relationship so that an instrument can be forced therethrough to prepunch the holes in the belt 76a. To prepunch the holes 77 in the endless belt 76 mattress wall material 35 is moved through the apparatus manually and the entire apparatus is stopped at the various points upon which it is desired to perform an operation, such as insert a handle or grommet, mark a corner, cut the material, etc. A hole is then punched in the endless belt 76 by utilizing the punch block 85 and the correct hole 86 therethrough. In this fashion a plurality of endless belts 76 can be produced and an operator need only operate the master control switch at the front of the unit to prepare the unit for different types of mattress wall material 35. Referring to FIG. 20 an air valve 87 is illustrated, which air valve supplies air to the air cylinder 61, the clutch 54 and the brake 57 to manually advance the mattress wall material 35 through the apparatus.

It should be noted that the present apparatus is controlled electrically to immediately remove pressure from the air cylinder 61, deenergize clutch 54 and energize the brake 57 whenever one of the switches 78, 80 or 81 associated with any of the pulleys 75 closes. Thus, prior to the operation of any of the means 36, 37 or 39 the advancement of the mattress wall material 35 is stopped. Once the operation is performed by the particular means 36, 37 or 39 is completed a switch or timing device associated therewith automatically activates the advance means 38. The particular electrical circuitry for performing the function is not illustrated because the various components are standard shelf items and can be combined in a variety of ways to provide the desired results.

Figures 4, 16:
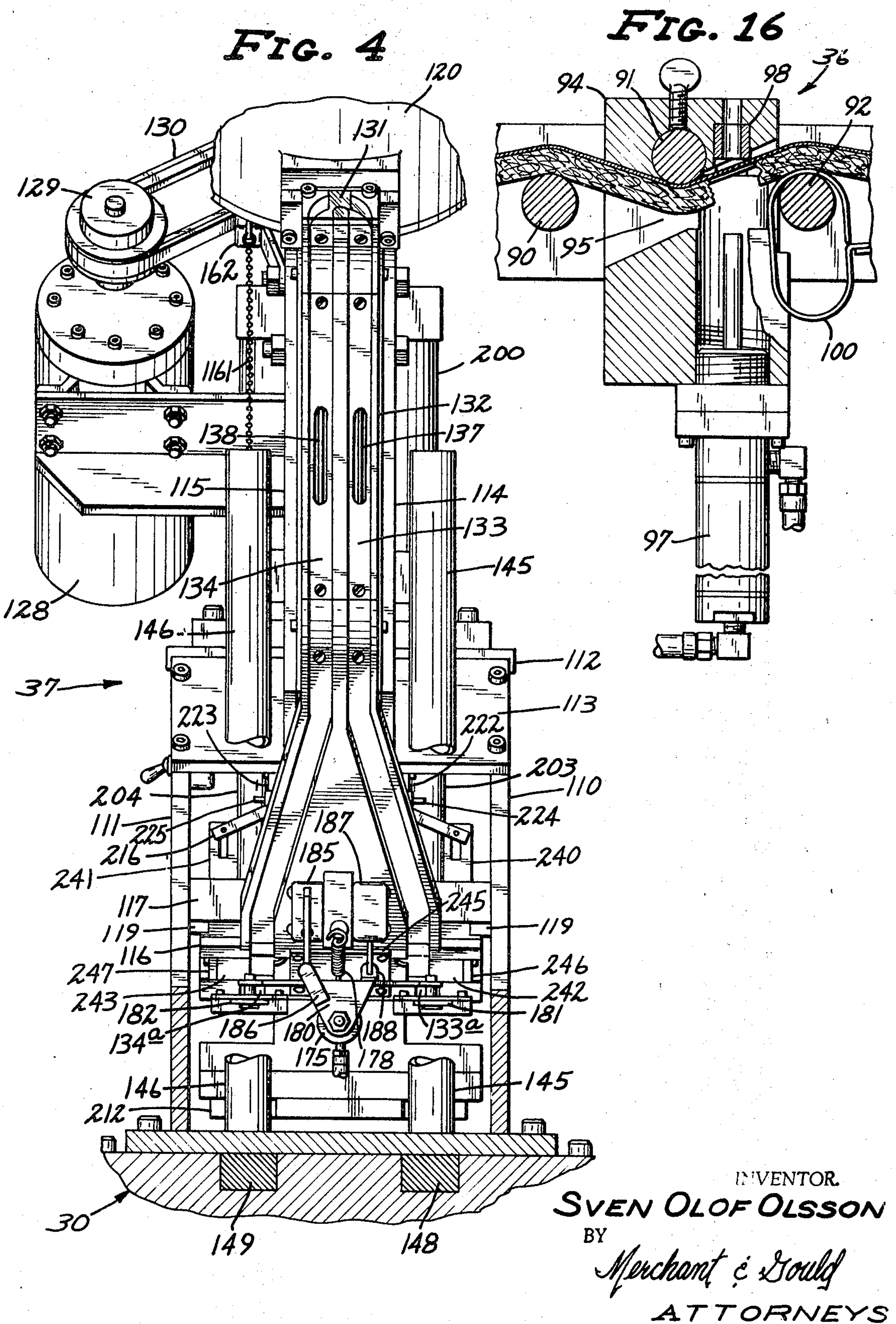
FIG. 4 is an enlarged view as seen from the line 4—4 in FIG. 3, portions thereof broken away.
FIG. 16 is an enlarged sectional view as seen from the line 16—16 in FIG. 1.
Figures 5, 6:
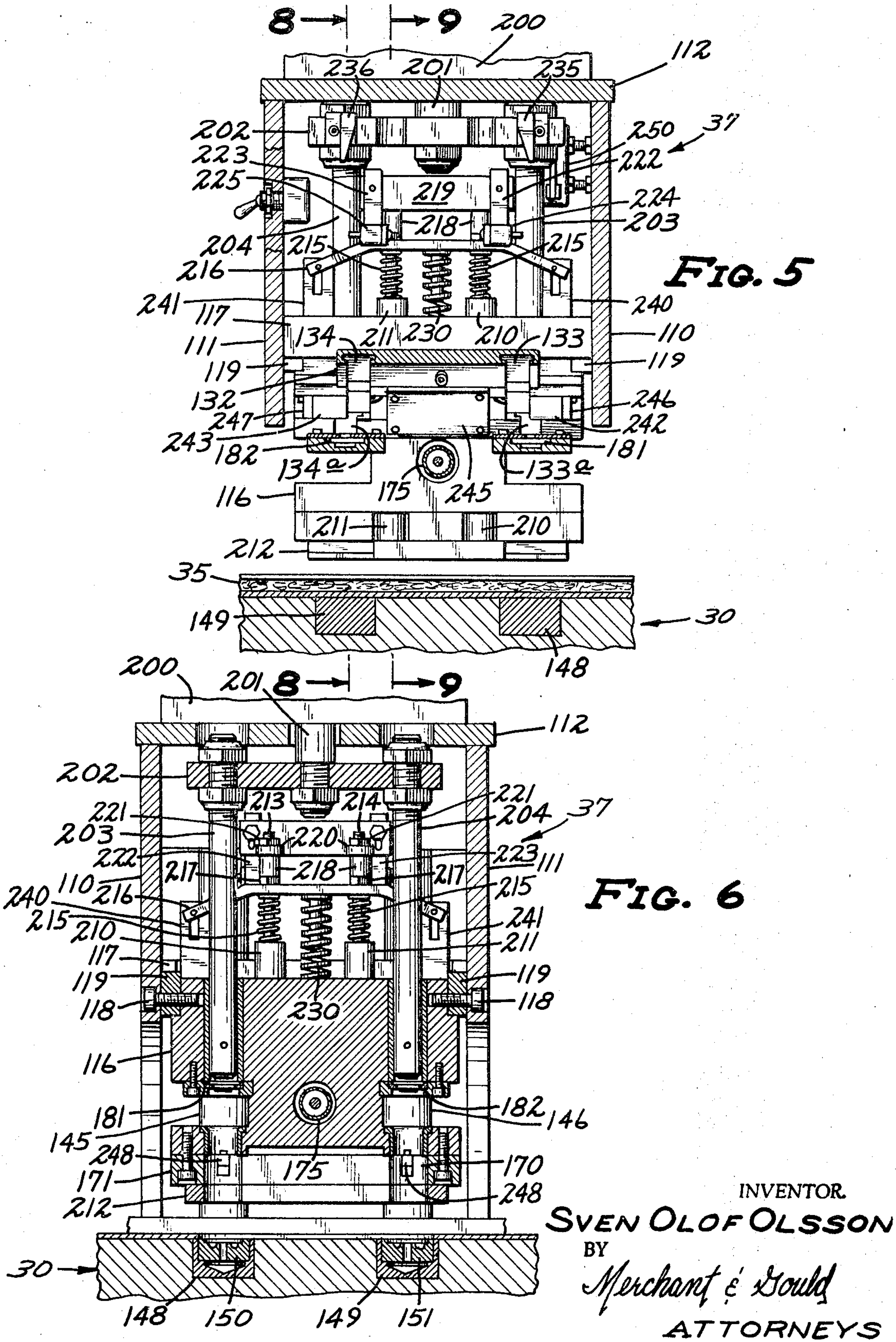
FIG. 5 is an enlarged sectional view as seen from the line 5—5 in FIG. 3.
FIG. 6 is an enlarged sectional view as seen from the line 6—6 in FIG. 3.

When a hole 77 appears beneath the switch 79 associated with the particular pulley 75 then in operation, the corner marking means 36 is energized. Referring to FIGS. 1, 2 and 16, three generally parallel horizontal rods 90, 91 and 92 are spaced apart sufficiently to allow the mattress wall material 35 to be threadedly engaged therebetween. A block 94 is engaged over the rod 91 and has a slot 95 therein formed to receive one edge of the mattress wall material 35 therein. A stop member 96 is engaged over the rod 91 adjacent the other end thereof to engage the opposite edge of the mattress wall material 35 and maintain the first edge within the slot 95. A dual-acting air cylinder 97 is attached to the lower end of the block 94 so that the piston rod extends upwardly through a hole into the slot 95. A hole is formed in the block 94 above the slot 95 and the mattress wall material 35 generally coaxial with the piston of the air cylinder 97 and a die or bushing 98 is placed therein to receive the piston.

When the air cylinder 97 is energized by a flow of air therein the piston is forced upwardly through the mattress wall material 35 into the die 98 to form a small hole in the mattress wall material 35 indicating or marking a corner. A timer (not shown) allows sufficient time for the complete extension of the piston into the die 98 after which the air cylinder 97 is reversed. A second timer (not shown) allows sufficient time for the extraction of the piston from the hole in the mattress wall material 35 after which the advance means 38 is again energized. The corner marking means 36 is attached to the rod 91 by means of thumbscrews or the like so that it can be removed in the event corner marking is not desired.

A switch 99 is mounted on the base 30 and has a loop 100 positioned over the rod 92 so that material threaded between the rods 90–92 maintains the switch 99 in an open position. However, when the end of the material moves from between the rods 90–92 the loop 100 is allowed to move upwardly and the switch 99 closes (or opens) deactivating the entire apparatus, and if desirable, indicating that the source of mattress wall material 35 is depleted.

Referring to FIGS. 1 through 15 the handle and/or vent grommet installing means 37 is illustrated. The installing means 37 includes a framework having a pair of parallel spaced apart side members 110 and 111, which are attached to the upper surface of the base 30 and extend generally perpendicularly upwardly therefrom, with a horizontal plate 112 affixed across the upper ends thereof. A second plate 113 extends between the two side members 110 and 111 adjacent the horizontal plate 112 but on a slightly inclined portion thereof (see FIGS. 3 and 4), which plate 113 has a pair of parallel spaced apart vertical members 114 and 115 affixed thereto and extending upwardly therefrom. An irregular shaped block 116 is also a portion of the framework and is mounted between the side members 110 and 111 by means of a cross bar 117 affixed to an upper edge of the block 116 and at either end thereof to the side members 110 and 111. Bolts 118 extend through side members 110 and 111 and through shims 119 into the sides of the block 116 to aid in holding it in place. The block 116 is adapted to guide the movements of several of the working members of the installing means 37 and toward this end it has a plurality of openings and grooves therein, which will be explained in detail presently.

Figures 7, 22, 23, 24, 25:
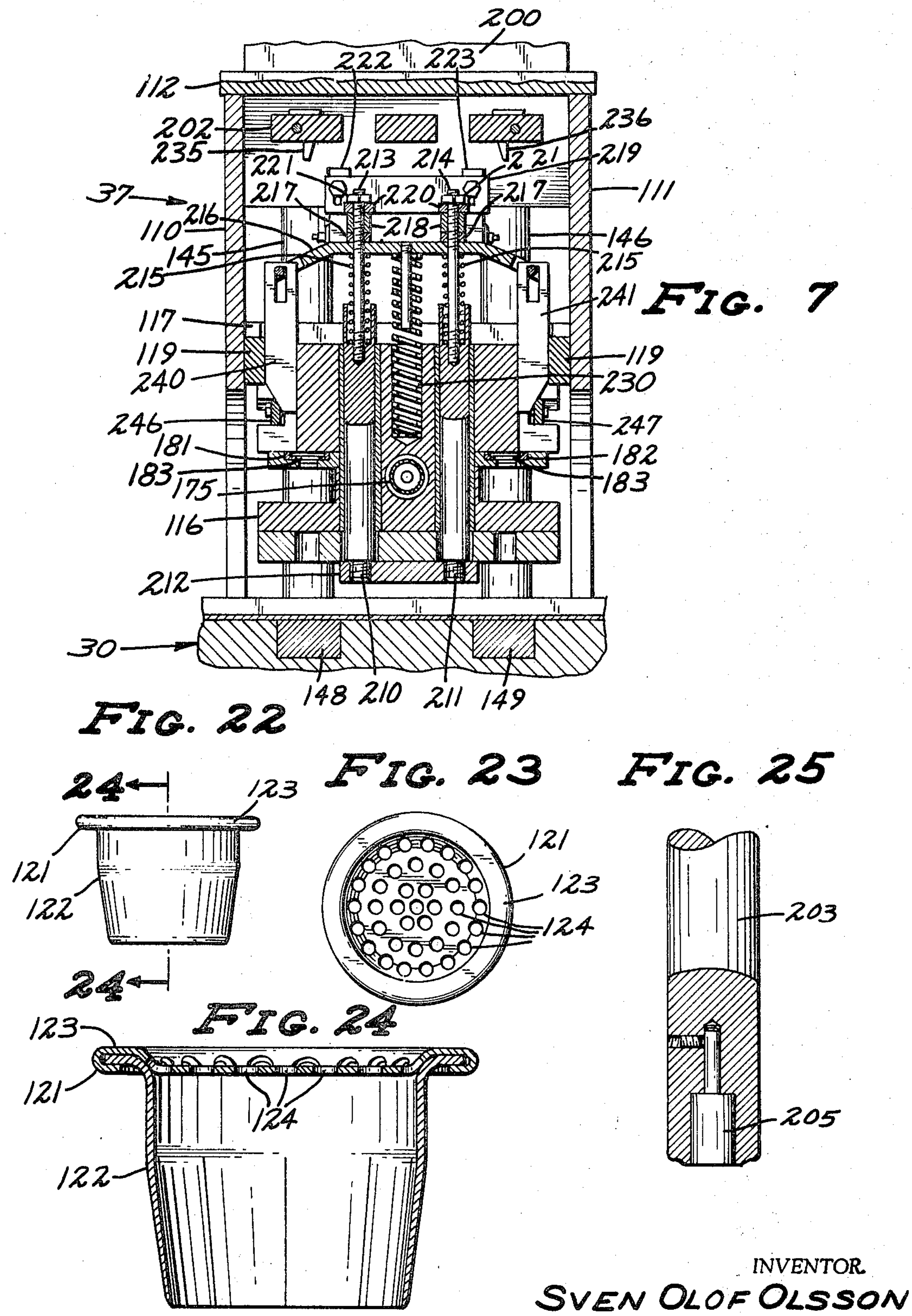
FIG. 7 is an enlarged sectional view as seen from the line 7—7 in FIG. 3.
FIG. 22 is a view in side elevation of a vent grommet.
FIG. 23 is a view in top plan of the vent grommet illustrated in FIG. 22.
FIG. 24 is an enlarged sectional view as seen from the line 24—24 in FIG. 22.
FIG. 25 is an enlarged detailed view of a portion of the vent installing mechanism, portions thereof broken away and shown in section.
Figures 8, 9:
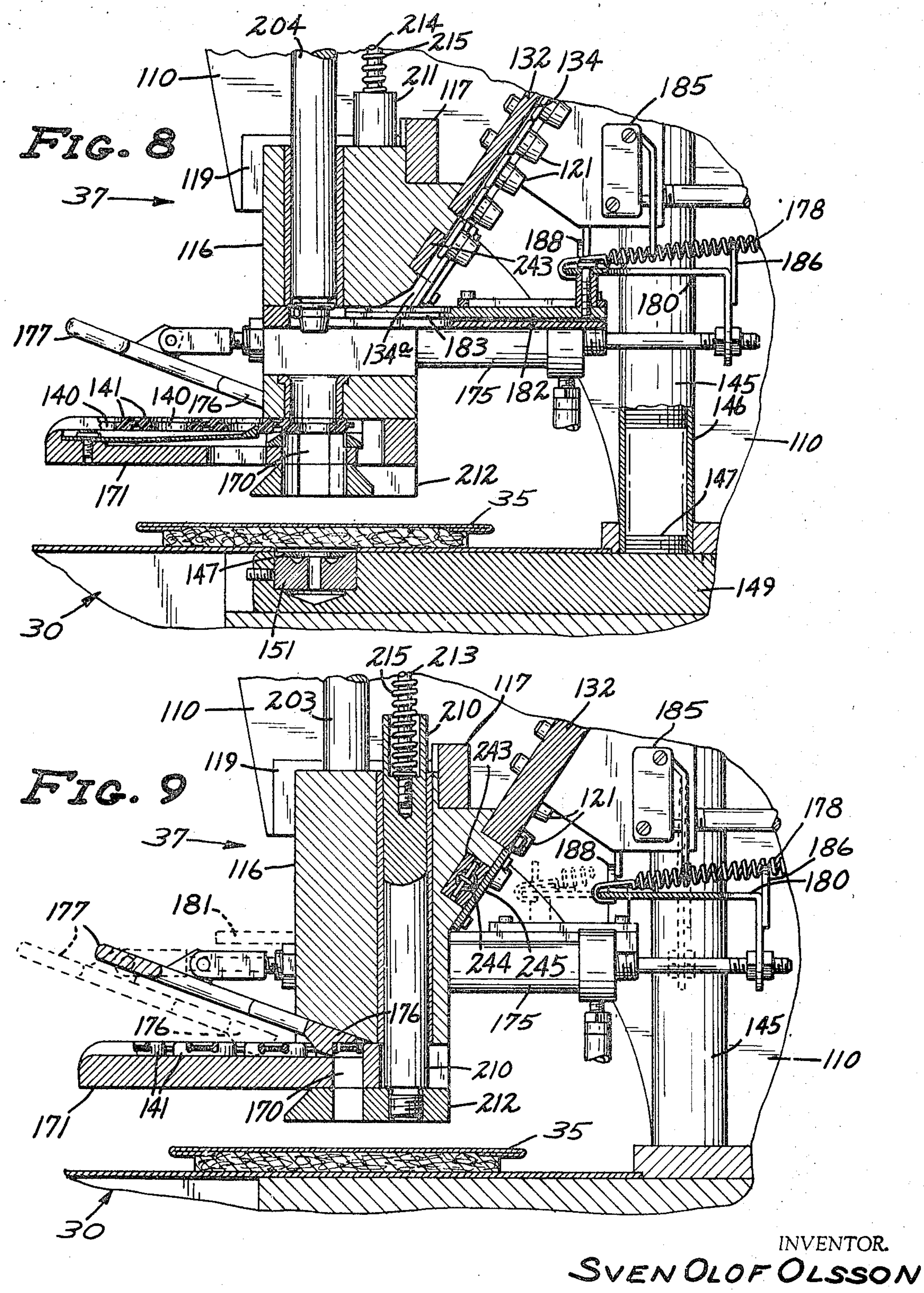
FIG. 8 is an enlarged sectional view as seen from the line 8—8 in FIG. 5.
FIG. 9 is an enlarged sectional view as seen from the line 9—9 in FIG. 5, illustrating in dotted lines the handle pick-up position.

A large cylindrical drum 120 is angularly mounted at the upper end of the vertical members 114 and 115 and is adapted to contain a supply of vent grommets 121 or the like (see FIGS. 22–24). The vent grommets 121 consist basically of a hollow cylindrical body 122 and an enlarged generally circular head 123 across one end thereof. The head 123 has a plurality of vents or holes 124 therethrough for the ingress and egress of air therethrough. In this embodiment the grommets 121 are formed of steel or other material sufficiently tough to cut the mattress wall material 35. The drum 120 has a disc 125 rotatably mounted therein adjacent the bottom thereof by means of a shaft 126. The shaft 126 extends through the bottom of the drum 120 and has a pulley 127 attached thereto, a motor 128 affixed near the upper end of the vertical members 114 and 115 drives the shaft 126 through a pulley 129 and belt 130 engaged with the pulley 127 and pulley 129. The disc 125 has a plurality of fins 125*a* extending outwardly therefrom away from the bottom of the drum 120 and adapted to agitate the supply of grommets 121 contained within the drum 120 as the disc 125 is rotated.

Figure 3:
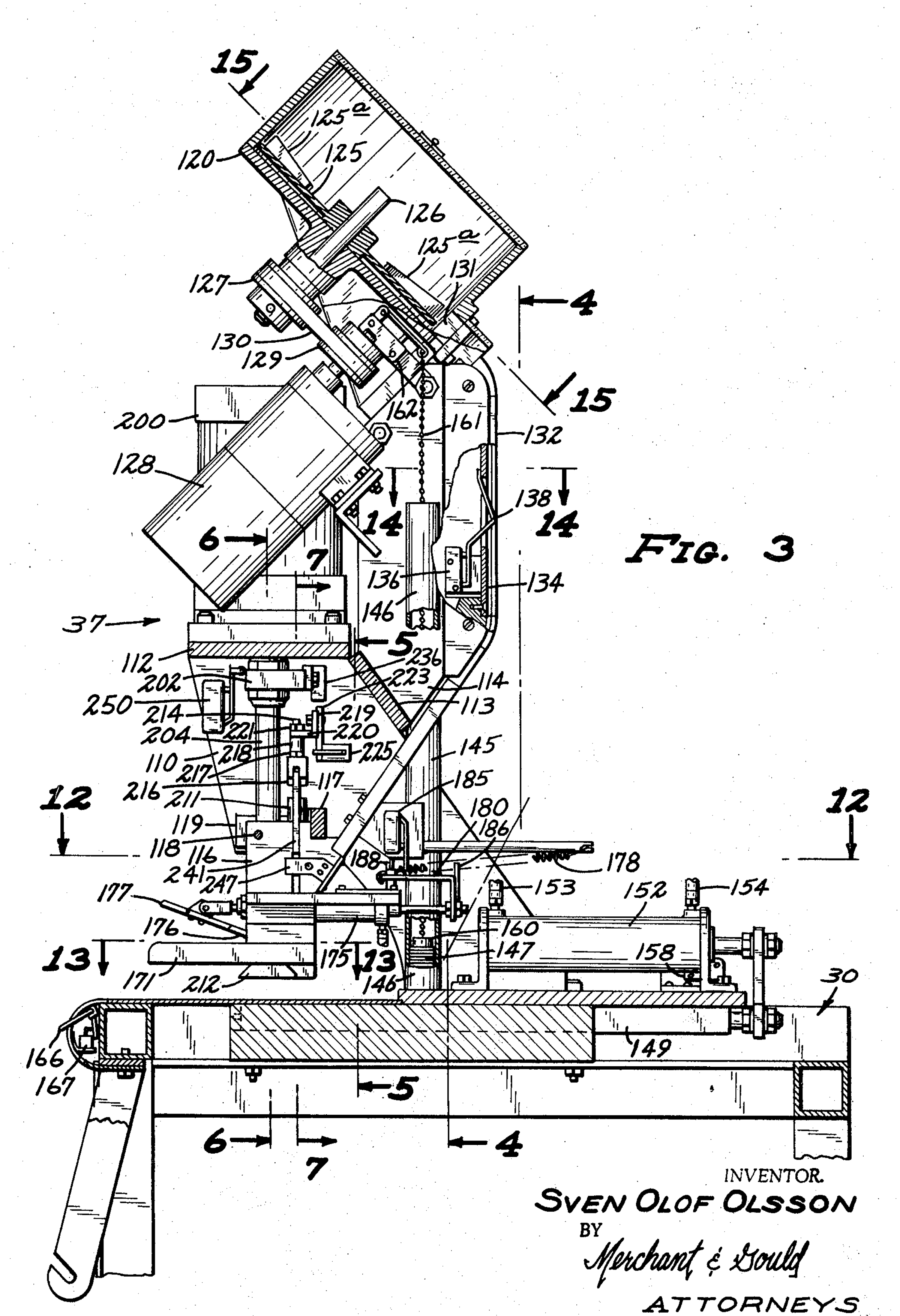
FIG. 3 is an enlarged sectional view as seen from the line 3—3 in FIG. 1, portions thereof broken away.

An opening 131 in the lower side of the drum 120 adjacent the bottom thereof is formed to allow single grommets 121 to pass therethrough with the head 123 oriented downwardly and the body 122 extending upwardly in the opening 131 (see FIGS. 3 and 15). The grommets 121 passing through the opening 131 of the drum 120 travel into a track 132 extending between the opening 131 and the block 116 (see FIGS. 3 and 4). The track 132 includes a pair of slots 133 and 134, each of which is undercut sufficiently to retain the head 123 of the grommets 121 engaged therein while allowing the body 122 to extend outwardly therefrom. Both slots 133 and 134 converge at the opening 131 so that grommets 121 emerging from the opening 131 divide substantially equally therebetween and eventually, fill both slots 133 and 134. The slots 133 and 134 diverge at the lower end thereof (see FIG. 4) so as to introduce the grommets 121 into the block 116 at points spaced apart approximately the same distance as openings 140 at the ends of a mattress handle 141 (see FIGS. 13 and 28). A pair of switches 135 and 136 are mounted on the inside of the track 132 so that elongated arms 137 and 138 attached thereto, respectively, extend slightly into the slots 133 and 134 so as to engage grommets 121 therein to maintain the switches 135 and 136 engaged. If either of the slots 133 or 134 become empty the associated switch 135 or 136 operates to shut down the apparatus.

Two elongated tubes 145 and 146 are mounted at the lower ends to the upper surface of the base 30 so as to be spaced apart a distance approximately equal to the distance between the lower ends of the slots 133 and 134 (see FIG. 4). The tubes 145 and 146 are adapted to be filled with a plurality of washers 147 positioned in overlying relation therein. The tube 146 contains a weight 160 which is positioned on top of the stack of washers 147 therein and has a chain 161 attached thereto, which chain 161 is attached at the other end to a switch 162. When the stack of washers 147 within the tube 146 becomes sufficiently low the weight 160 activates the switch 162 through the chain 161 to shut down the apparatus until the tubes 145 and 146 are refilled.

A pair of elongated bars 148 and 149 are slidably mounted in slots in the upper surface of the base 30 so that the upper surface of the bars 148 and 149 are approximately level with the upper surface of the base 30. One end of each of the bars 148 and 149 has an insert 150 and 151, respectively, positioned therein, which inserts 150 and 151 are formed to receive a single washer 147 therein and to further receive the end of the body 122 of a grommet 121 therein through the center of the washer 147 and roll the end radially outwardly, under sufficient pressure, to prevent the withdrawal of the grommet from the washer 147 (see FIG. 6).

The bars 148 and 149 are mounted so that the inserts 150 and 151 move between a position below the tubes 145 and 146 and a second position below the block 116, which will be explained in more detail presently. The ends of the bars 148 and 149 opposite the inserts 150 and 151 are attached to the plunger of a dual-acting air cylinder 152 (see FIGS. 3 and 12). The air cylinder 152 has a first inlet 153 which, when pressurized, moves the bars 148 and 149 so that the inserts 150 and 151 are positioned in a washer receiving position below the tubes 145 and 146. The air cylinder 152 has a second inlet 154, which, when pressurized, moves the bars 148 and 149 so that the inserts 150 and 151 with washers 147 therein are positioned in a grommet receiving position below the block 116.

A pair of switches 157 and 158 mounted on base 30 adjacent the ends of the bars 148 and 149 attached to the piston of an air cylinder 152, indicate when the air cylinder 152 has moved the bars 148 and 149 to the two extremes of their movement. Switch 157 operates, when the inserts 150 and 151 have moved beneath the tubes 145 and 146 and receive washers therein, to remove pressure from the inlet 153 and apply pressure to the inlet 154 thereof. The air cylinder 152 then reverses movement of the bars 148 and 149 and operates to move the inserts 150 and 151 into the correct position below the block 116, whereupon the switch 158 provides an indication.

A roll of plastic handles 141, affixed to each other in a generally parallel relationship by a flash of material, is provided on a roller 165 inset in the front of the base 30 (see especially FIG. 2). The end of the roll of handles is threaded upwardly beneath a pivotally attached bar 166, which maintains a switch 167 closed as long as handles are positioned therebelow but allows the switch 167 to operate and shut down the apparatus when handles are no longer present, and into a slot 170 in the block 116. The block 116 has an outwardly, or forwardly, projecting ledge 171 sufficiently wide for several handles 141 to lie thereon (see FIG. 13) and the slot 170 in the block 116 is in alignment with a groove in the upper surface of the ledge 171. An air cylinder 175 extends through the block 116 so that a connecting rod extending from one end thereof overlies the ledge 171. The connecting rod of the air cylinder 175 has a wedge shaped member 176 pivotally attached thereto and extending rearwardly into the slot 170. The wedge shaped member 176 is gravity biased downwardly into engagement with the handles 141 in the groove of the ledge 171 and reciprocal action of the air cylinder 175 (see FIG. 9) causes the wedge shaped member 176 to move outwardly from the block 116 and engage the next handle 141 after which a spring 178 returns the piston of the air cylinder 175 to the normal position and the wedge shaped member 176 moves a handle 141 into the slot 170 in the desired position. The wedge shaped member 176 has a handle 177 extending in the opposite direction and forming an integral part thereof, which handle 177 is utilized to manually move a handle 141 into position in the slot 170.

At the opposite end of the air cylinder 175 an outwardly extending connecting rod is attached to a generally horizontal plate 180 positioned for horizontal movements thereabove. As the wedge shaped member 176 moves outwardly to engage another handle 141, the plate 180 moves inwardly toward the block 116 and vice versa. The horizontal plate 180 has attached thereto a pair of elongated, spaced apart, generally parallel, horizontal plates 181 and 182 engaged in slots in the block 116 for reciprocal sliding movements therein. Each of the plates 181 and 182 has an elongated slot 183 extending from the end thereof positioned in the block 116 toward the end attached to the plate 180 so as to form a bifurcated end on each of the plates 181 and 182. The plates 181 and 182 are positioned in a spaced relation below the ends of the slots 133 and 134 in the track 132 and are adapted to receive grommets 121 therefrom, in a manner to be explained presently, with the heads 123 engaged in the slots 183 and the bodies 122 extending downwardly therefrom. When the air cylinder 175 moves the plates 181 and 182 into the block 116 grommets 121 engaged in the slots 183 therein are moved into a position in the block 116 directly above openings 140 in each end of a handle 141 positioned in the slot 170. When the plates 181 and 182 are moved outwardly from the block 116 by the air cylinder 175 they are placed in a grommet receiving position.

A switch 185, mounted above the plate 180, is actuated by an upwardly projecting element 186 when the plates 181 and 182 move into the position wherein the grommets are aligned with the openings 140 in the handle 141. A second switch 187 (see FIG. 4) mounted adjacent the switch 185 is actuated by an upwardly projecting element 188 when the plates 181 and 182 are moved outwardly into the grommet receiving position. The switch 185 reverses the pressure on the air cylinder 175, after a pair of grommets 121 are moved into the correct position, to move a handle 141 into the correct position in the slot 170. The switch 187 indicates that the handle 141 and the grommet 121 are correctly positioned for crimping.

A large air cylinder 200 is mounted on the upper surface of the plate 112 so that a connecting rod 201 therefrom extends through the plate 112. A plate 202 is attached in a generally horizontal orientation to the connecting rod 201 below and generally parallel with the plate 112. The plate 202 has affixed therein two generally vertical downwardly extending crimping rams 203 and 204. The lower ends of the crimping rams 203 and 204 are engaged in vertical openings through the block 116, which openings are aligned coaxially with grommets 121 correctly positioned in the block 116 by the plates 181 and 182, the openings 140 in a handle 141 correctly positioned in the slot 170 by the wedge shaped member 176, and the inserts 150 and 151 when the bars 148 and 149 are in the forward or crimping position. Further, when the crimping rams 203 and 204 are in their uppermost position the lower ends thereof are spaced slightly above the upper surface of the plates 181 and 182. Each of the crimping rams 203 and 204 has a small magnet 205 (see FIG. 25) inserted axially into the end thereof to attract and maintain a grommet 121, moved into the correct position beneath the crimping rams 203 and 204 by the plates 181 and 182, engaged coaxially on the ends thereof after the plates 181 and 182 are withdrawn from the block 116.

Positioned below the plate 202 and somewhat to the rear of the crimping rams 203 and 204 are a pair of connecting rods 210 and 211, which extend vertically through the block 116 and attach to a horizontally oriented shoe 212 positioned adjacent the lower surface of the block 116 (see FIG. 3). Referring especially to FIG. 7, bolts 213 and 214 are threadedly engaged in the upper end of the connecting rods 210 and 211 so as to extend vertically upwardly therefrom. Each of the bolts has coaxially positioned thereover a compression spring 215. A generally horizontally oriented bar 216 turned somewhat downwardly at the ends thereof has a pair of holes therein positioned to coincide with the bolts 213 and 214 and rest on the compression spring 215. A nut 217 is threaded onto the upper end of each of bolts 213 and 214 so as to engage the upper surface of the bar 216. A spacer 218 is then positioned coaxially over each of the bolts 213 and 214 and a horizontally extending vertically oriented bar 219, having horizontally outwardly extending ears 220 coaxially engaged over the bolts 213 and 214. A nut 221 is then threadedly engaged over each of the bolts 213 and 214 to hold the entire assembly fixedly in position.

The bar 219 has attached to the surface thereof, opposite the surface having the ears 220 attached thereto, a pair of vertically oriented horizontally spaced apart bars 222 and 223, each of which has attached to the lower end thereof a switch 224 and 225, respectively. The bars 222 and 223 are vertically adjustable so that the positions of the switches 224 and 225 relative to the bar 216 is adjustable. A compression spring 230 is positioned vertically between the connecting rods 210 and 211 and between the block 116 and the lower surface of the bar 216 to bias the bar 216 and the attached connecting rods 210 and 211 vertically upwardly. The bar 216 is positioned, relative to the plate 202 so that during downward movement of the plate 202 the bar 216 is engaged first causing the connecting rods 210 and 211 to move the foot 212 downwardly into engagement with mattress wall material 35 positioned below the block 116 prior to the actual crimping action of the crimping rams 203 and 204. The foot 212 holds the mattress wall material 35 firmly in position so that there is no movement thereof during the crimping action.

As additional pressure is supplied to the air cylinder 200 the connecting rod 201 forces the plate 202 and the crimping rams 203 and 204 downwardly against the pressure of the compression springs 215 and 230. Two cams 235 and 236 (see FIGS. 5 and 11) are affixed to the edge of the plate 202 so as to engage the switches 224 and 225 when the desired amount of crimping action has occurred. Upon engagement of the switches 224 and 225 by the cams 235 and 236 the pressure on the air cylinder 200 is reversed and the plate 202 is raised upwardly into the normal position. It should be noted that the plate 202 has openings therethrough (see FIG. 7) so that the bolts 213 and 214 can extend therethrough to allow the plate 202 to engage the bar 216. While a cam and switch mechanism is provided for limiting the movement of the crimping rams 203 and 204, it should be understood that many other types of devices might be utilized to serve this purpose. For example, an adjustable timer could be included in the electrical circuitry so that the distance the crimping rams 203 and 204 travel, for different thicknesses of material, could be varied thereby.

A pair of vertically positioned bars 240 and 241 are attached adjacent the outer edges of the bar 216 and each has a cam surface at the lower end thereof (see especially FIG. 7). The bars 240 and 241 are slidably engaged in slots in the block 116 for vertical sliding movements. At approximately the lower end of the grommet track 132, a pair of stop members 242 and 243 are slidably engaged in a groove in the block 116, for generally horizontal movements. Each of the stop members 242 and 243 has a generally vertically oriented slot therethrough which are similar to and axially alignable with the slots 133 and 134, respectively, in the grommet track 132. A tension spring 244 attached at either end to the adjacent ends of the stop members 242 and 243 normally maintains the stop members positioned with the slots therethrough aligned with the slots 133 and 134 in the grommet track 132. A plate 245 affixed over the ends of the stop members 242 and 243 and the spring 244 holds the assembly within the slot in the block 116 for free horizontal sliding movements.

Figures 10, 11:
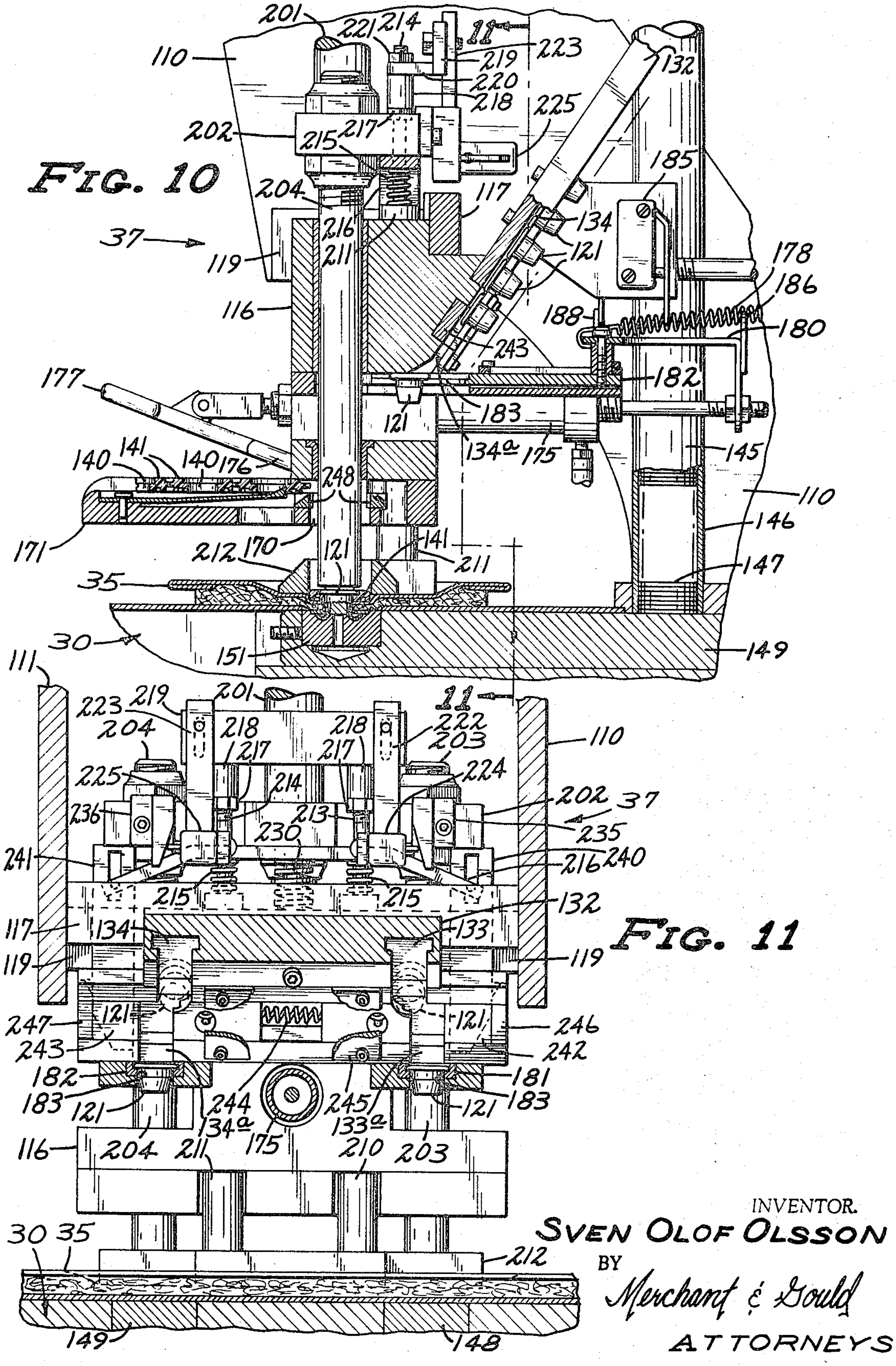
FIG. 10 is a view similar to FIG. 8 illustrating the various parts in the crimping position.
FIG. 11 is a sectional view as seen from the irregular line 11—11 in FIG. 10.
Figure 12:
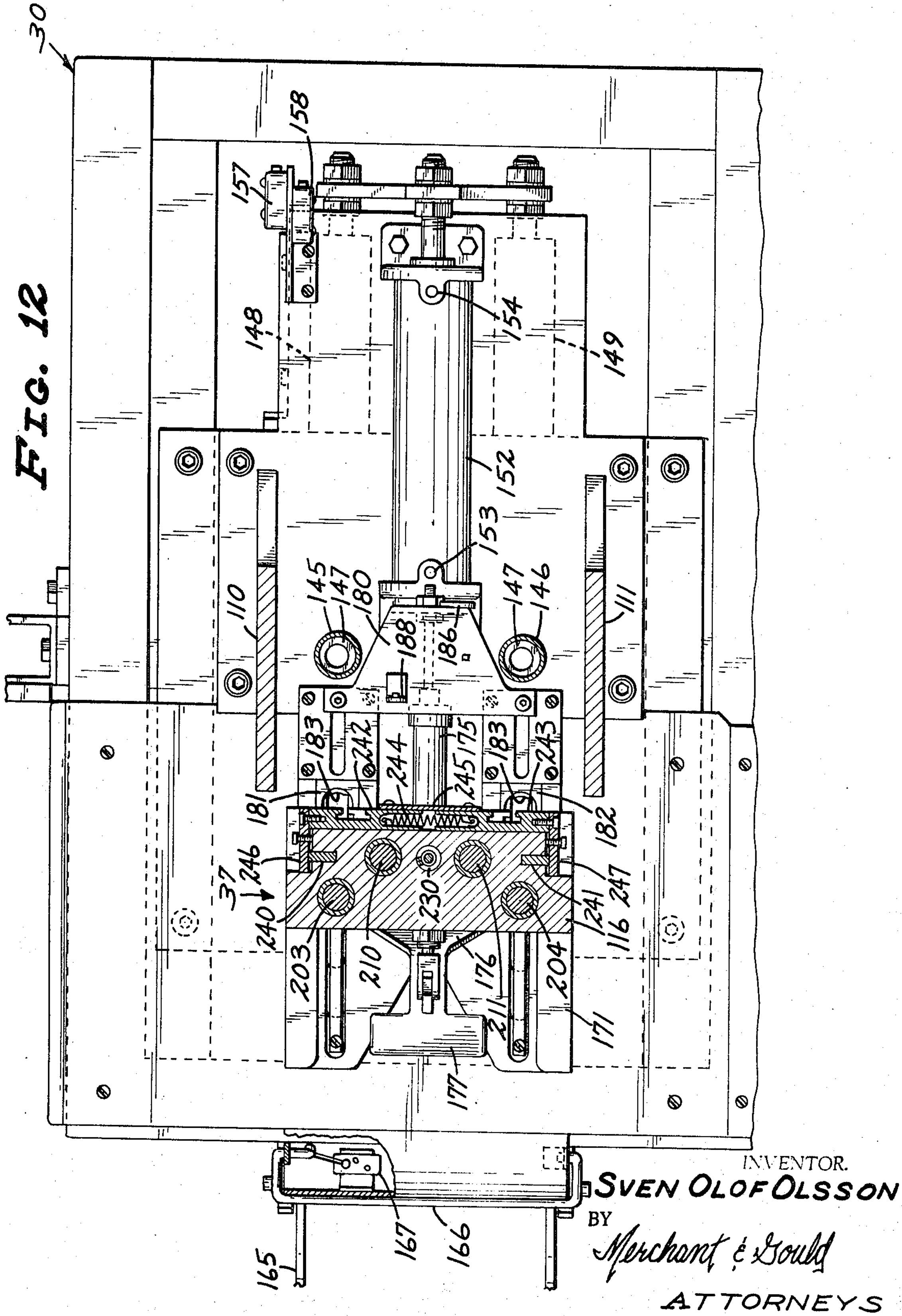
FIG. 12 is an enlarged sectional view as seen from the line 12—12 in FIG. 3, portions thereof broken away.

The ends of the stop members 242 and 243 opposite the ends connected by the spring 244 each have a generally L-shaped plate 246 and 247, respectively, affixed thereto for engagement by the cam surfaces at the lower ends of the bars 240 and 241, respectively (see especially FIGS. 3, 11 and 12). As the cam surfaces of the bars 240 and 241 engage the plates 246 and 247 the stop members 242 and 243 are forced apart, or horizontally outwardly, until the slots therethrough coincide with laterally outwardly offset continuations 133*a*, 134*a*, of slots 133, 134, which are formed on block 116. The slots 183 in the plates 181 and 182, respectively, communicate with slots 133*a*, 134*a* and allow a single grommet 121 to drop into each of the slots 183 in the plates 181 and 182 where they are ready to be moved into engagement with the magnets 205 at the bottoms of the crimping rams 203 and 204. In the meanwhile the stop members 242 and 243 have moved out of alignment with the slots 133 and 134 so that more grommets cannot leave the track 132. With the movement of the bars 240 and 241 upwardly after the crimping rams 203 and 204 have completed a stroke, the stop members 242 and 243 return to their normal position under the bias of the spring 244 and another grommet 121 is free to enter the slots in each of the stop members 242 and 243.

Thus, upon the occurrence of a hole 77 beneath the switch 80 associated with the endless belt 76 in operation the air cylinder 200 is energized driving the crimping rams 203 and 204 downwardly to force a pair of grommets 121 through the openings 140 in a mattress handle 141 and through the mattress wall material to be rolled outwardly, or crimped, on the underside of a pair of washers 147 in the inserts 150 and 151. Forcing the handle 141 in the slot 170 downwardly causes knives 248 positioned adjacent the vertical opening for the crimping rams 203 and 204 (see FIGS. 10 and 13) to cut the connecting flash from each side of both of the enlarged ends thereof. During the downward movement of the crimping rams 203 and 204 the bars 240 and 241 also move downwardly and cam the stop members 242 and 243 outwardly to drop a grommet 121 in each of the slots 183 of the plates 181 and 182. After the grommets 121 being crimped by the crimping rams 203 and 204 have been crimped or turned over the desired amount, as measured by the cams 235–236 and switches 224–225 or a suitable timing element, pressure is reversed on the air cylinder 200 and the crimping rams 203 and 204 return to the normal position. When the crimping rams 203 and 204 have returned to the normal position a switch 250 (see FIGS. 2 and 3) is engaged and a circuit is closed pressurizing air cylinders 152 and 175.

Air cylinder 152 is pressurized at the inlet 153 so that the bars 148 and 149 move outwardly to receive washers 147 from the tubes 145 and 146 in the inserts 150 and 151 therein. Upon the bars 148 and 149 moving outwardly a sufficient distance switch 157 is contacted and the pressure on the cylinder 152 is removed from the inlet 153 and applied to the inlet 154. The bars 148 and 149 are then returned to the position wherein the inserts 150 and 151 underlie the crimping rams 203 and 204. With the bars 148 and 149 returned to the normal position the second switch 158 is closed providing an indication of the correct placement of the bars 148 and 149 for a continuation of the cycle.

Pressurizing the air cylinder 175 causes the piston therein to move toward the front of the machine so that the wedge shaped member 176 engages the next handle 141 from the supply thereof. Simultaneously the plates 181 and 182 move the grommets 121 positioned therein into the block 116 and in axial alignment with the crimping rams 203 and 204 so that the magnets 205 at the ends thereof attract the grommets 121 and maintain them in the correct position. With the completion of the stroke of the piston of air cylinder 175 toward the front of the apparatus the switch 185 is engaged by the actuating element 186 and the pressure on the air cylinder 175 is reversed so that the piston moves in the opposite direction. As the piston of the air cylinder 175 moves in the opposite direction the wedge shaped member 176 moves the previously engaged handle into the correct position in the slot 170 and the plates 181 and 182 are withdrawn from beneath the crimping rams 203 and 204 in preparation for another crimping cycle. When the piston of the air cylinder 175 has returned to its normal position the switch 187 is contacted by the actuating element 188 providing an indication of readiness. With both of the switches 158 and 187 closed the apparatus is ready for another crimping cycle upon the occurrence of a hole 77 beneath a switch 80 of one of the endless belts 76.

After the completion of a crimping cycle and the actuating of the switch 250, the advance means 38 is actuated as previously described, and the mattress wall material 35 is again driven through the apparatus. With the occurrence of a hole 77 beneath a switch 81 associated with the endless belt 76 in operation, the material cutting means 39 is energized and the advance means 38 is deactivated. Simultaneously, an air operated cylinder 251 is energized to drive a clamping foot 252, carried thereby, toward the base 30 and clamping engagement of mattress wall 35 therebetween. Cylinder 251 is positioned adjacent to the path of travel of cutting means 39 and with the path of travel of cutting means 39 intermediate clamping foot 252 and advancing means 38. The cutting means 39 includes a circular cutting blade 260 driven by a motor 261 and mounted on a frame 262 so as to be oriented in a plane generally perpendicular to the direction of travel of the mattress wall material 35 through the apparatus. The frame 262 is mounted for sliding movements in the plane of the cutting blade 260 and within a groove 263 in the upper surface of the base 30. A dual-acting air cylinder 264 is attached between the frame 30 and the frame 262 so as to move the frame 262 in the groove 263 across the path of travel of the mattress wall material 35.

With the occurrence of a hole 77 beneath a switch 81 of endless belt 76 in operation the air cylinder 264 is pressurized, whereby the frame 262 is moved across the path of travel of the mattress wall material 35 and the motor 261 is energized so that the cutting blade 260 severs the mattress wall material 35. Upon the piston of the air cylinder 264 being extended to its full length a switch 265 is engaged by an actuating element 266, attached to the frame 262, and the pressure on the air cylinder 264 is reversed. With the piston of the air cylinder 264 returned to its normal position a second switch 267 is engaged by the actuating element 266 and the motor 261 is deenergized while the advance means 38 is reactuated. It should be understood that the cutting means 39 could be excluded from the base 30 and the cutting operation could be performed manually or through the use of separate apparatus if so desired.

Figure 27:
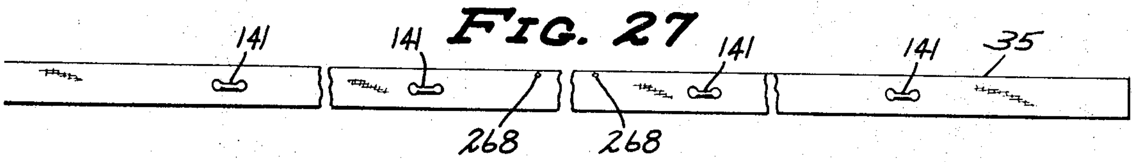
FIG. 27 is a diagrammatic view of a mattress side wall illustrating the various operations performed thereon and their general relationship.

Thus, vent grommet and/or handle installing apparatus is disclosed which automatically installs handles at desired locations on mattress wall material and, if desired, marks corners, as at 268 in FIG. 27, of the mattress wall material as well as severing the mattress wall material at the correct length. The entire operation can be performed automatically and the apparatus will continue to produce mattress walls having correctly positioned vent grommets and/or handles thereon as long as the various supplies of material, mattress wall material, and handles are available. The present apparatus greatly reduces the labor involved in installing vent grommets and/or handles as well as improving the quality of installation thereof.

What is claimed is:

1. Apparatus for automatically affixing in mattress walls vent grommets having a hollow cylindrical body and an enlarged head at one end thereof, comprising:

(a) a base;

(b) advance means mounted on said base for receiving preformed mattress wall material therein from a source of wall material and moving the wall material through the apparatus;

(c) washer positioning means mounted on said base and having a supply of washers associated therewith for positioning washers adjacent the inner surface of the wall material in a predetermined orientation relative thereto;

(d) grommet positioning means mounted on said base and having a supply of grommets associated therewith for positioning a grommet adjacent the outer surface of the wall material in approximate coaxial alignment with each correctly positioned washer;

(e) crimping means mounted on said base for engaging the head of each of the correctly positioned grommets and forcing the other end of the body of each of said grommets through the wall material and the washer positioned at the other side thereof and crimping the edges of said other end to hold the assembly fixedly in place;

(f) adjustable energizing means attached to said advance means, said washer positioning means, said grommet positioning means, and said crimping means, for sequentially and periodically energizing each thereof to automatically install vent grommets in mattress wall material.

2. Apparatus as set forth in claim 1 having in addition corner marking means mounted on the frame and attached to the adjustable energizing means for periodically and in a correct sequence energizing said marking means to mark the mattress wall material to coincide with the corners of a mattress.

3. Apparatus as set forth in claim 1 wherein the advance means includes a roller having a gear-like outer periphery for contacting the mattress wall material and advancing the same with a minimum amount of expansion due to compression thereof.

4. Apparatus as set forth in claim 1 having in addition cutting means mounted on said base and attached to said adjustable energizing means for severing portions of the mattress wall material from the source to provide a mattress wall of the desired length.

5. Apparatus as set forth in claim 1 wherein the crimping means includes adjustable limit means for allowing the amount the grommets are crimped to be adjusted in accordance with the thickness of the mattress wall material.

6. Apparatus as set forth in claim 5 wherein the limit means includes limit switches adjustable in position.

7. Apparatus as set forth in claim 5 wherein the limit means includes a timing device for allowing the crimping means to be energized only a predetermined length of time.

8. Apparatus as set forth in claim 1 wherein the adjustable energizing means includes an endless belt having a plurality of switches associated therewith for sequential operation during a rotation of said belt and periodic operation as said belt rotates each complete revolution.

9. Apparatus as set forth in claim 8 wherein the adjustable energizing means includes a plurality of endless belts each having associated switches and means for placing a selected one of said belts in control.

10. Apparatus for automatically affixing to mattress walls elongated handles having openings therethrough adjacent either end, comprising:

(a) a base;

(b) means mounted on said base for receiving a supply of preformed mattress wall material;

(c) advance means mounted on said base for moving the wall material through the apparatus;

(d) handle positioning means mounted on said base and receiving handles from a supply of handles associated therewith for correctly positioning a handle on the outer surface of the wall material;

(e) washer positioning means mounted on said base and having a supply of washers associated therewith for positioning a washer adjacent the inner surface of the wall material in approximate axial alignment with each opening at the ends of the correctly positioned handle;

(f) grommet positioning means mounted on said base and having a supply of grommets with a hollow cylindrical body and an enlarged head at one end thereof associated therewith for positioning a grommet in each opening at the ends of the correctly positioned handle;

(g) crimping means mounted on said base for energizing the head of each of the grommets positioned in the openings at the ends of the handle and forcing the other ends of the body of each of said grommets through the wall material and the washer positioned at the other side thereof and crimping the edges of said other end to hold the assembly fixedly in place;

(h) cutting means mounted on said base for severing a portion of the mattress wall material from the source to provide a mattress wall of the desired length; and (i) adjustable energizing means attached to said advance means, said handle positioning means, said washer positioning means, said grommet positioning means, said crimping means and said cutting means for sequentially and periodically energizing each thereof to automatically provide a portion of mattress wall material having a desired length to enclose a mattress with handles correctly positioned thereon.

References Cited

UNITED STATES PATENTS

| | | | |
|---|---|---|---|
| 2,614,714 | 10/1952 | Erhardt | 227—1 |
| 3,064,264 | 11/1962 | Spinney | 227—18 |
| 3,080,565 | 3/1963 | Parsons et al. | |
| 3,193,164 | 7/1965 | Frasier | 227—39 XR |
| 3,243,092 | 3/1966 | Frasier | 227—95 XR |

FOREIGN PATENTS

| | | |
|---|---|---|
| 584,218 | 9/1959 | Canada. |

GRANVILLE Y. CUSTER, Jr., Primary Examiner

U.S. Cl. X.R.

227—21, 27, 39, 76, 95